2,774,690
Patented Dec. 18, 1956

2,774,690

WATER REPELLENT TREATMENT UTILIZING A METHYLHYDROGENPOLYSILOXANE AND A TITANIUM COMPOUND

Sydney Russell Cockett, Halifax, John Gwynant Evans, Menston-in-Wharfedale, and George Landells, Leeds, England, assignors to Bradford Dyers' Association Limited, Bradford, England No Drawing. Application April 8, 1952, Serial No. 281,222

Claims priority, application Great Britain April 16, 1951

4 Claims. (Cl. 117—135.5)

The present invention relates to methods and compositions for hydrophobing porous materials which are normally non-water repellent or for improving the existing water-repellent properties of porous materials.

It is already well-known that the deposition of siliconaceous substances on the surface of materials normally non-water repellent confers the property of water repellency. The deposition of silicon compounds for this purpose has hitherto been carried out in a variety of ways including application from the vapor phase, from the liquid phase, from solution in an inert organic solvent, from aqueous solution, from aqueous dispersion, or in the form of a paste or grease. Silicon compounds which have been employed include substituted silanes, e. g., alkyl-, aryl-, aralkyl-, alkyloxy-, aryloxy-, aralkyloxy-silanes or -halogeno-silanes, amino silanes (silylamines), silazanes, silanols, siloxanes, polysiloxanes (hereinafter called silicones) and silicon esters.

Although the exact nature of the hydrophobic coating formed is unknown, organo-halogeno-silanes, for example, are thought to combine with reactive groups of substances on or in the surface to be treated leaving a deposit or film of siloxane or silicone which renders the surface water repellent. Thus a mixture of methylchlorosilanes applied from the vapor phase is particularly effective. The hydrolysis products of the substituted silanes may be dissolved in strong water-soluble bases to give the so-called siliconates conferring water-repellent properties. Indeed, any of the aforesaid substituted silanes used for the production of silicones, when applied under suitable conditions, may be regarded as potential agents for the production of water-repellent surfaces.

It is an object of the present invention to provide improved methods and compositions for rendering porous materials water repellent. It is a particular object to provide improvements in methods and compositions which employ organosilicon compounds for treating porous materials to render them water repellent.

According to the present invention striking improvements in the degree of water repellency produced by means of treatments with hydrophobic silicon compounds, such as hereinbefore mentioned, are obtained when such treatments are carried out in conjunction with certain compounds of titanium.

Materials which may be treated according to the invention include paper, textile materials (natural and synthetic), leather, fur and foodstuffs. They also include wood and porous ceramic bodies.

As will appear hereinafter there is a variety of suitable titanium compounds and of ways of putting the invention into practcial effect depending on the nature of the particular titanium compound and the particular silicon compound used.

The titanium compounds to be used are those organic or inorganic titanium compounds which are potentially capable of undergoing hydrolysis or decomposition, if necessary in the presence of a base or alkali, to an oxide or hydrated oxide of titanium. Examples are the organic esters of titanic acid, the titanium salts of fatty acids including the titanium soaps, and the hydrolyzable or decomposable inorganic titanium salts. Titanium oxides and their hydrates may be used as such if in colloidal or finely divided form.

Suitable esters of titanic acid include ethyl titanate, propyl titanate, butyl titanate, hexyl titanate, heptyl titanate and cresyl titanate. There may also be used esters polymerised by condensation, of the type described by G. Winter in the Journal of Oil and Colour Chemists Association, No. 367, vol. 34, pages 30–35.

Suitable titanium salts of fatty acids include titanium acetate, titanium ethyl hexoate, titanium laurate and titanium stearate.

Suitable inorganic salts include titanium halides and titanium sulfates.

The organosilicon compounds used in practicing the present invention may be any of the well-known organosilicon compounds conventionally used in water-repellent treatments, as exemplified above. Preferably the organosilicon compounds employed are those which contain organic groups linked to silicon through carbon-silicon linkage. Particularly preferred are those compounds in which the organic groups are alkyl radicals such as methyl, ethyl, propyl and octadecyl; unsaturated aliphatic radicals; aryl radicals such as phenyl and biphenyl; substituted aryl radicals such as halophenyl and alkaryl or aralkyl radicals. These materials may be hydrolyzable silanes such as the well-known halo-, alkoxy-, or aminosilanes or they may be the polymeric organosiloxanes formed by the hydrolysis of such hydrolyzable silanes.

Preferred siloxanes are those such as the methylpolysiloxanes, particularly those which also contain hydrogen atoms directly bonded to silicon atoms in the molecule. These methylhydrogenpolysiloxanes are well-known to the art.

In a preferred embodiment of the invention, a methylhydrogenpolysiloxane is employed in a mixture which also contains a dimethylpolysiloxane, such as the mixtures disclosed in U. S. Patent No. 2,588,365. This mixture comprises from 20 to 70 percent by weight of (1) a methylpolysiloxane containing between 2 and 2.1 methyl radicals per silicon atom and having a viscosity at 25° C. of at least 1000 centistokes and less than 100,000 centistokes, and from 80 to 30 percent by weight of (2) a methylhydrogenpolysiloxane containing between 1.0 and 1.5 methyl radicals and between 0.75 and 1.25 hydrogen atoms bonded to silicon per silicon atom, there being a total of between 2 and 2.25 methyl radicals plus hydrogen atoms per silicon atom.

The proportion of titanium compounds to organosilicon compounds employed may vary over a wide range, and a certain amount of improvement is found in practically any combination of the two types of constituents. For example, improvements are found when the proportion of titanium compound used varies from 1 percent by weight to 150 percent by weight based upon the weight of the organosilicon compound employed. The preferred proportion of titanium compound employed, however, varies from about 5 percent to about 125 percent by weight based upon the weight of the organosilicon compound. The optimum ratio of the two types of compounds will, of course, depend both upon the particular compounds employed and the material being treated.

The titanium compounds and organosilicon compounds are not necessarily employed as single constituents. That is, a plurality of either or both types of compounds may be used if desired.

A final heating of material treated according to the invention is preferably but not essentially performed. Its duration may vary from a few seconds to, say, thirty minutes according to the temperature or means of heating employed, it being understood that the higher the temperature the shorter the duration. A temperature range of from 100° C. to 200° C. is generally suitable, but the temperature used may be varied within or outside these limits to suit the nature of the material which is treated. The heating may be carried out by any of the conventional methods such as by passing the treated materials through ovens or hot air chambers or over heated surfaces; by infra red radiation or by high frequency heating; or by passage through a heated oleaginous or molten metal bath. As an alternative to heat treatment, the material may be exposed to visible and/or ultra violet light.

The silicon compound may be applied to the material before, simultaneously or after the application of the titanium compound, and either or both compounds may be applied in the liquid or vapor phase, in an organic solvent solution or dispersion, or in an aqueous solution or dispersion.

In one method of performing the invention, the silicon compound is dissolved in a common organic solvent with the titanium compound. This solution is then applied to the base material and the solvent evaporated. The material may then be heated.

In another method of performing the invention the base material is firstly treated with the titanium compound, either in organic solvent solution or dispersion followed by drying, or as vapor, and secondly treated with an aqueous emulsion or dispersion of the silicon compound. If the titanium compound is sufficiently stable to water to permit its emulsification or dispersion in water, as is the case if it is a titanium soap, it may be applied simultaneously with the aqueous emulsion or dispersion of the silicon compound. In either case, after drying off the water, the treated base material is preferably heated.

Components useful for applying in the vapor phase are, for example, the organo-halogeno-silanes on the one hand and the ortho esters of titanic acid or the titanium halides on the other hand. The base materials may be exposed to the action of the respective vapors either concurrently or consecutively.

It is known that certain organo compounds of titanium, e. g. the ortho esters of titanic acid, have the power of conferring hydrophobic properties upon hydrophilic base materials such as paper or textile substrate. The hydrophobic quality so conferred is, however, relatively weak are requires relatively large amounts of the organo titanium compound.

By applying these esters to textile substrates and testing in the manner described below we find the conferred water repellency to be of a low order. It is possible, however, to improve the water repellency by subsequent heat treatment. Nevertheless the combined effect of the silicon compounds described above with the titanium compounds as defined is quite unexpected since it is synergistic in character, that is to say the water repellent effect obtained by a given weight of a mixture of both compounds is superior to that produced by the same weight of either compound applied separately. This synergistic action could not have been foreseen on the basic of the known properties of the individual components. This will become clearer by reference to the examples. It signifies an economic advantage because the relatively expensive silicon compound can be replaced, in part, by the cheaper titanium compounds. Moreover, when either compound gives its optimum effect on subsequent heat treatment, the degree or severity of this treatment can be reduced, with maintenance of equal or better water repellency, when the two compounds are used conjointly according to the invention. This is advantageous when the base material is sensitive to heat.

Inorganic titanium compounds as defined likewise produce enhanced effects when used with the silicon compounds. Thus the application of titanium tetrachloride in the form of its vapor in the presence of moisture to produce a hydrolyzed or partially hydrolyzed product on the substrate, followed by the application of the silicon compound results in improved water repellency over the use of the silicon compound alone.

The esters and certain of the soaps of titanium are similarly highly sensitive to hydrolysis and this may be brought about by moisture on the surface to be treated. It may here be observed that it is still possible to obtain an improved water repellent effect when the surface containing a water-sensitive organo-titanium compound is steamed for several minutes prior to the deposition of a silicon compound. Hydrolysis may also be assisted by applying the titanium esters or titanium soaps in presence of known hydrolyzing agents, e. g. bases or alkalies.

The test used for determining the water repellency of textiles in the following examples is that known as Tentative Textile Standard No. 8, 1947 (England) and is described in the Journal of the Textile Institute, 1947, vol. 38, S. 4. It is called the "Bundesmann" test. The rate of flow of water according to the test is 65 ml. per minute and the test time 10 minutes. Means are provided in this test for any water passing through the fabric to be collected and measured. Thus two observations are recorded; (a) the resistance to actual wetting as measured by the weight increase determination, and (b) the extent to which the fabric resists passage of water. The test results are the mean of at least two determinations.

In the following examples, which are illustrative only, the parts given are parts by weight. The "silicone" employed throughout the examples, unless otherwise specified, is a mixture containing 60 percent by weight of trimethylsiloxy end-blocked methylhydrogenpolysiloxane and 40 percent by weight of a trimethylsiloxy end-blocked dimethylpolysiloxane having a viscosity of 12,500 centistokes at 25° C.

*Example 1*

A plain weave nylon fabric is impregnated with a solution containing 1.875 parts of silicone and 0.125 part of butyl titanate in 98 parts of petroleum spirit (boiling range 130–180° C.). The fabric is dried in the air at 20° C. Further samples of the same fabric are impregnated with solutions containing respectively 2 parts of silicone solids or 2 parts of butyl titanate in 98 parts of the petroleum spirit and subject to the same drying conditions. The combination of silicone and titanate gives an outstandingly superior water repellent effect to that of the same weight of either component applied separately as shown by the results of Bundesmann tests.

|  | Test Results ||
| --- | --- | --- |
|  | Absorption (percent) | Penetration (cc.) |
| Untreated | 95.0 | 130 |
| Treated with 2% silicone | 60.0 | 142 |
| Treated with 2% butyl titanate | 67.0 | 113 |
| Treated with 1.875% silicone and 0.125% butyl titanate | 15.8 | 1 |

*Example 2*

A cotton gabardine fabric is impregnated with a solution containing 1.75 parts of silicone and 0.25 part of butyl titanate in 98 parts of petroleum spirit (boiling range 130–180° C.), dried and heated at 150° C. for 2 minutes. The treatments are repeated at the same concentrations omitting first the silicone and then the butyl titanate component. Results of water repellency tests carried out by the Bundesmann method illustrate the striking improvement obtained when the silicone and titanate are used in conjunction.

| | Test Results | |
|---|---|---|
| | Absorption (percent) | Penetration (cc.) |
| Untreated | 183.0 | 106 |
| Treated with 1.75% silicone | 110.3 | 68 |
| Treated with 0.25% butyl titanate | 89.0 | 43 |
| Treated with 1.75% silicone and 0.25% butyl titanate | 43.4 | Nil |

*Example 3*

A plain weave nylon fabric is impregnated with a solution containing 1.875 parts of silicone and 0.125 part of butyl titanate in 98 parts of petroleum spirit (boiling range 130–180° C.), dried and heated at 140° C. for 10 minutes. Further samples of the same fabric are impregnated with solutions containing respectively 2 parts of silicone solids or 2 parts of butyl titanate in 98 parts of petroleum spirit (boiling range 130–180° C.) and subjected to the same heating conditions. The combination of silicone and titanate gives an outstandingly superior water repellent effect to that of the same weight of either component applied separately as shown by the following results of Bundesmann tests.

| | Test Results | |
|---|---|---|
| | Absorption (percent) | Penetration (cc.) |
| Treated with 2% silicone | 38.0 | 28 |
| Treated with 2% butyl titanate | 58.3 | 128 |
| Treated with 1.875% silicone and 0.125% butyl titanate | 7.4 | 0.5 |

*Example 4*

An acetate rayon faille fabric is impregnated with a solution containing 1.875 parts of silicone and 0.125 part of butyl titanate in 98 parts of petroleum spirit (boiling range 130–180° C.), dried and heated at 140° C. for 10 minutes. Further samples of the same fabric are impregnated with solutions containing respectively 2 parts of silicone solids or 2 parts of butyl titanate in 98 parts petroleum spirit (boiling range 130–180° C.) and subjected to the same heating conditions. The combination of silicone and titanate gives an outstandingly superior water repellent effect to that of the same weight of either component applied separately as shown by the following results of Bundesmann tests.

| | Test Results | |
|---|---|---|
| | Absorption (percent) | Penetration (cc.) |
| Treated with 2% silicone | 79.1 | 57 |
| Treated with 2% butyl titanate | 73.2 | 23 |
| Treated with 1.875% silicone and 0.125% butyl titanate | 24.2 | 2 |

*Example 5*

An acetate satin fabric is impregnated with a solution containing 2 parts of silicone in 98 parts of a petroleum spirit (boiling range 130–180° C.) and dried. The fabric is then passed through a solution containing 0.125 part of propyl titanate in 97.875 parts of petroleum spirit, dried and heated at 140° C. for 4 minutes. The after treatment with propyl titanate gives a remarkable increase in the degree of water repellency as shown by results of tests on the Bundesmann apparatus.

| | Test Results | |
|---|---|---|
| | Absorption (percent) | Penetration (cc.) |
| Treated with silicone only | 176.2 | 390 |
| Treated with silicone, aftertreated with propyl titanate | 36.6 | 24 |

*Example 6*

An aqueous emulsion of a silicone is prepared by the following method. Three parts of the cationic heat-decomposable emulsifying agent "Ammonyx T" (a cetyl-alkylbenzyl ammonium chloride) are stirred with 0.1 part of acetic acid and 15 parts of water and while stirring 67.7 parts of silicone and 20.2 parts of water are added. The dispersion is diluted with 39 parts of water for impregnation purposes. A plain weave nylon fabric is impregnated with this dispersion, dried and then heated at 140° C. for 4 minutes.

Another specimen of the same fabric is impregnated with a solution containing 0.06 part of butyl titanate in 99.94 parts of a petroleum spirit (boiling range 130–180° C.), dried and heated at 140° C. for 4 minutes.

A further specimen of the same fabric is impregnated with 0.06 part of butyl titanate in the same way, dried, impregnated with the above-mentioned aqueous dispersion of silicone, and finally dried and heated at 140° C. for 4 minutes. The water repellent effect obtained in the presence of the titanium compound is markedly superior to that given by the silicone or butyl titanate alone, as shown by the results of the Bundesmann water repellency test.

| | Test Results | |
|---|---|---|
| | Absorption (Percent) | Penetration (cc.) |
| Treated with the silicone only | 33.5 | 3 |
| Treated with the butyl titanate only | 50.6 | 26 |
| Treated with the butyl titanate, after-treated with the silicone | 14.8 | 1 |

*Example 7*

A plain nylon fabric is steamed for 15 minutes and then exposed to a moist atmosphere of titanium tetrachloride in an enclosed vessel for 1 hour. The fabric is then dried and impregnated with a solution containing 2 parts of silicone in 98 parts of a petroleum spirit, dried and heated at 140° C. for 4 minutes. The water repellent effect given by this treatment is superior to that obtained when the treatment with the titanium compound is omitted, as shown by the results obtained when the materials are tested by the Bundesmann method.

| | Test Results | |
|---|---|---|
| | Absorption (Percent) | Penetration (cc.) |
| Treated with the silicone only | 59.9 | 22 |
| Treated with the titanium compound, after-treated with the silicone | 32.9 | 12 |

*Example 8*

A plain nylon fabric is impregnated with a solution of 2.5 parts of titanous sulfate and 4 parts of sulfuric acid in 93.5 parts of water for 15 minutes at room temperature, mangled, neutralized in dilute ammonium hydroxide solution, rinsed in water and dried. The fabric is then impregnated with a solution containing 2 parts of silicone in 98 parts of a petroleum spirit (boiling range 130–180° C.), dried and heated at 140° C. for 4 minutes. The water repellent effect produced by this treatment is much superior to that given by the silicone treatment alone on the fabric, as is shown by the results of the Bundesmann test.

|  | Test Results | |
|---|---|---|
|  | Absorption (percent) | Penetration (cc.) |
| Treated with the silicone only | 52.0 | 97 |
| Treated with titanous sulfate and ammonium hydroxide, then with silicone | 22.6 | Nil |

*Example 9*

Paper weighing 44 grams per square meter and 0.06 mm. thick is passed through a solution containing 1.875 parts of silicone and 0.125 part of butyl titanate in 98 parts of petroleum spirit (boiling range 130–180° C.). The paper is heated at 140° C. for 4 minutes. For comparison purposes similar paper is passed through a solution containing 2 parts of silicone and similar paper is passed through a solution containing 2 parts of butyl titanate in 98 parts of the petroleum spirit, and given, in each case, the same heat treatment.

The improved water repellency obtained with the combined application of silicone and titanate is shown when the papers are placed under running water. Untreated paper wets immediately. The papers treated with silicone or titanate alone show a low degree of water repellency, whereas the paper treated with the silicone and titanate combination gives an outstanding water repellent effect, remaining virtually unwetted after holding under running water for one minute.

*Example 10*

An acetate rayon faille fabric is impregnated in a solution of 0.125 part of butyl titanate in 99.875 parts of petroleum spirit (boiling range 130–180° C.), dried and heated at 140° C. for 4 minutes and then exposed for 60 seconds in an enclosed vessel to the vapors of a mixture of methylchlorosilanes. The fabric is then neutralized by passing through a dilute solution of ammonia. A further specimen of the acetate rayon fabric is given a similar treatment with omission of the pre-treatment in butyl titanate. Yet a further specimen is treated in the butyl titanate solution alone and heated at 140° C. for 4 minutes.

The improved effect brought about by employing butyl titanate in conjunction with the vapor treatment is shown by the results of tests on the Bundesmann apparatus.

|  | Test Results | |
|---|---|---|
|  | Absorption (percent) | Penetration (cc.) |
| 1. Treated with methylchlorosilane vapors | 83.4 | 148 |
| 2. Treated with butyl titanate (0.125%) alone | 71.2 | 4 |
| 3. As 1, but pre-treated in 0.125% butyl titanate | 57.8 | 2 |

*Example 11*

An asbestos filter cloth is impregnated in a solution of 0.47 part of silicone and 0.03 part of butyl titanate in 99.5 parts of a petroleum spirit (boiling range 130–180° C.), dried and heated at 140° C. for 4 minutes. For comparison two further portions of the asbestos fabric are treated with 0.5 part of the silicone and 0.5 part of butyl titanate, respectively, in the same solvent and submitted to the same heat treatment. The treated fabrics together with an untreated control are tested for resistance to absorption of water during immersion by employing a modification of the Tentative Test Method 21–41 described in the Technical Manual and Year Book of the American Association of Textile Chemists and Colorists, 1950, 26, 132. The modification consists of removing loosely attached water from the test specimen at the conclusion of the test by giving six sharp hand-shakes. The amount of water retained in the test specimen is an inverse measure of its resistance to wetting. Results on the treated fabrics show the improved effect obtained with the silicone-titanate combination.

Test results, absorption (percent)
Untreated _____ 146.2
Treated with butyl titanate (0.5%) only _____ 114.3
Treated with the silicone (0.5%) only _____ 53.8
Treated with the silicone (0.47%) and butyl titanate (0.03%) _____ 26.9

*Example 12*

Improvements similar to those obtained in Example 11 are obtained when the method of said example is repeated using ethyl titanate, propyl titanate, hexyl titanate, titanium acetate, titanium ethyl hexoate or titanium laurate in place of the butyl titanate. In treating fabrics, results comparable to those obtained in the above examples are obtained when the silicone mixture employed in the above examples is replaced by an unadulterated polymeric methylhydrogen-polysiloxane.

*Example 13*

A plain weave fabric made from "Terylene" polyester is impregnated with a solution containing 1.875 parts of silicone and 0.125 part of propyl titanate in 98 parts of petroleum spirit (boiling range 130–180° C.). The fabric is dried in a current of air at 20° C. A further sample of the same fabric is impregnated with a solution containing 2 parts of silicone only in 98 parts of the petroleum spirit and then dried in the same manner. The two samples are exposed side by side to light from a Fadeometer for a period of 8 hours. When tested by the Bundesmann method the synergistic effect of the propyl titanate is evident.

|  | Test Results | |
|---|---|---|
|  | Absorption (percent) | Penetration (cc.) |
| 1. Treated with silicone only | 28.5 | 2 |
| 2. Treated with silicone and the titanate | 14.1 | Nil |

*Example 14*

An acetate taffeta fabric is impregnated in a solution containing 0.125 part of butyl titanate in 99.875 parts of petroleum spirit (boiling range 130–180° C.) and dried at 20° C. A portion of this fabric along with a similar piece which has not been so treated is exposed in an enclosed vessel at 20° C. to the vapor of vinyl trichlorsilane for 30 seconds. The water-repellent effect as measured by the Bundesmann method is as follows:

|  | Test Results | |
|---|---|---|
|  | Absorption (Percent) | Penetration (cc.) |
| 1. Treated with titanate only | 93.2 | 60 |
| 2. Treated with vinyl trichlorsilane only | 75.0 | 10 |
| 3. Treated with titanate followed by vinyl trichlorsilane | 43.2 | Nil |

*Example 15*

An acetate taffeta fabric is impregnated in a solution containing 0.125 part of butyl titanate in 99.875 parts of petroleum spirit (boiling range 130–180° C.) and dried in a stream of air at 20° C. A portion of this fabric along with a similar piece not so treated is exposed for 10 minutes in an enclosed vessel at 20° C. to the vapor of silicon tetrachloride. Finally all three patterns are baked for 4 minutes at 140° C. The water-repellent effect is given below:

|  | Test Results | |
|---|---|---|
|  | Absorption (Percent) | Penetration (cc.) |
| 1. Treated with titanate only | 74.1 | 26 |
| 2. Exposed to silicon tetrachloride without pretreatment | 72.0 | 48 |
| 3. Treated with titanate and exposed to silicon tetrachloride | 43.4 | Nil |

*Example 16*

A wool garbardine fabric is impregnated in a solution containing 1.875 parts of silicone and 0.125 part of titanium ethyl hexoate in 98 parts of petroleum spirit (boiling range 130–180° C.), dried and heated at 140° C. for 4 minutes. The treatments are repeated on other samples of the same fabric with solutions containing respectively 2 parts of silicone only and secondly with 0.125 part of titanium ethyl hexoate only in a total volume of 100 parts. The superiority of the effect when the two compounds are used together is demonstrated by the following Bundesmann results:

|  | Test Results | |
|---|---|---|
|  | Absorption (percent) | Penetration (cc.) |
| 1. 2 parts silicone only | 70.5 | 2 |
| 2. 0.125 part of titanium ethyl hexoate only | 117 | 192 |
| 3. 1.875 part of silicone with 0.125 part of titanium ethyl hexoate | 31.2 | Nil |

*Example 17*

A wool gabardine fabric is impregnated in a solution containing 1.5 parts of silicone and 0.1 part of hexyl titanate in 98.4 parts of petroleum spirit (boiling range 130–180° C.), dried and heated at 140° C. for 4 minutes. A further treatment on another sample of the same fabric in which the hexyl titanate is omitted was carried out as a control experiment. Results of Bundesmann tests show the marked improvement brought about by the small quantity of hexyl titanate.

|  | Test Results | |
|---|---|---|
|  | Absorption (percent) | Penetration (cc.) |
| 1. Silicone (1.5%) only | 79.2 | 15 |
| 2. Silicone (1.5%) and hexyl titanate (0.1%) | 38.0 | 1 |

*Example 18*

A wool gabardine fabric is impregnated by the method described in Example 17 with the exception that the hexyl titanate is replaced by the same weight of heptyl titanate. The small amount of the heptyl ester produces a marked improvement in water-repellency as shown by the Bundesmann test results.

|  | Test Results | |
|---|---|---|
|  | Absorption (Percent) | Penetration (cc.) |
| 1. Silicone (1.5%) only | 79.2 | 15 |
| 2. Silicone (1.5%) and heptyl titanate (0.1%) | 46.1 | 1 |

*Example 19*

A cellulose acetate rayon fabric is impregnated in a solution of 0.25 part of cresyl titanate in 99.75 parts of petroleum spirit (boiling range 130–180° C.), dried and then impregnated in a solution of 2 parts of silicone in 98 parts of the same petroleum solvent. The treated pattern is heated at 140° C. for 10 minutes. As a control experiment, another portion of the cellulose acetate fabric is impregnated in the silicone solution only and heated under the same conditions. Results of Bundesmann tests show that the addition of the small quantity of cresyl titanate brings about a marked improvement in the water-repellent effect.

|  | Test Results | |
|---|---|---|
|  | Absorption (Percent) | Penetration (cc.) |
| 1. Silicone (2%) only | 176.2 | >390 |
| 2. Cresyl titanate (0.25%) and silicone (2%) | 77.2 | 49 |

*Example 20*

A cellulose acetate fabric is impregnated in a solution containing 1.5 parts of silicone and 0.1 part of butyl titanate in 98.4 parts of petroleum spirit (boiling range 130–180° C.). A further sample of the same material is given a similar impregnation in which the butyl titanate is replaced by an equal weight of a condensed form of the same ester which has been polymerised by condensation. Both treated materials were heated at 140° C. for 4 minutes and submitted to the Bundesmann test. The results show that the condensed form of butyl titanate is even more effective in promoting water-repellency than is the monomeric form.

|  | Test Results | |
|---|---|---|
|  | Absorption (percent) | Penetration (cc.) |
| 1. Silicone containing uncondensed butyl titanate | 69.3 | 44 |
| 2. Silicone containing condensed butyl titanate | 36.3 | 25 |

*Example 21*

A plain weave fabric consisting wholly of the polyester "Terylene" is impregnated in a solution of 0.1 part of butyl titanate in 99.9 parts of petroleum spirit (boiling range 130–180° C.), dried in a current of air at 20° C. and submitted to the vapors of dimethyl dichlorosilane for 3 minutes at 20° C. The fabric is then submitted to ammonia vapor for 3 minutes and finally heated at 140° C. for 4 minutes.

A further portion of the polyester fabric is impregnated in the butyl titanate solution and is dried and heated as before. Yet a further portion is submitted to the vapor treatments only and is also heated as before. Bundesmann test results show that the titanate ester when used in conjunction with the halogeno-silane brings about a marked improvement in water-repellency.

|  | Test Results | |
|---|---|---|
|  | Absorption (percent) | Penetration (cc.) |
| 1. No treatment | 77.1 | 330 |
| 2. Treated with butyl titanate only | 57.0 | 234 |
| 3. Treated with vapor of dimethyl dichlorosilane | 62.6 | 256 |
| 4. Treated with butyl titanate and the vapor of dimethyl dichloro-silane | 42.4 | 180 |

Materials which can stand higher curing temperatures such as porous ceramic materials are beneficially treated with compositions in which the organosilicon constituent is a dimethylpolysiloxane fluid. Resinous materials such as the well-known and commercially available methyl- and/or phenyl-substituted organopolysiloxane resins are sometimes beneficially substituted (as, for example, in the That which is claimed is:

1. The method of rendering textile material water repellent comprising contacting said material with both (1) a mixture of from 20 to 70 per cent by weight of a methylpolysiloxane containing between 2 and 2.1 methyl radicals per silicon atom and having a viscosity at 25° C. of at least 1,000 cs. and less than 100,000 cs., and from 80 to 30 percent by weight of a methylhydrogenpolysiloxane containing between 1.0 and 1.5 methyl radicals and between 0.75 and 1.25 hydrogen atoms bonded to silicon per silicon atom, there being a total of between 2 and 2.25 methyl radicals plus hydrogen atoms per silicon atom, and (2) a titanium compound selected from the group consisting of esters of titanic acid, titanium salts of fatty acids, titanium halides, and titanium sulfates.

2. The method of claim 1 wherein the titanium compound is butyl titanate.

3. The method of rendering textile material water repellent comprising contacting said material with both a methylhydrogenpolysiloxane containing between 1.0 and 1.5 methyl radicals and between 0.75 and 1.25 hydrogen atoms bonded to silicon per silicon atom, there being a total of between 2 and 2.25 methyl radicals plus hydrogen atoms per silicon atom, and a titanium compound selected from the group consisting of esters of titanic acid, titanium salts of fatty acids, titanium halides, and titanium sulfates.

4. The method of claim 3 wherein the titanium compound is butyl titanate.

References Cited in the file of this patent

UNITED STATES PATENTS

| | | |
|---|---|---|
| 2,386,259 | Norton | Oct. 9, 1945 |
| 2,512,058 | Gulledge | June 20, 1950 |
| 2,584,905 | Moulton et al. | Feb. 5, 1952 |
| 2,588,365 | Dennett | Mar. 11, 1952 |
| 2,732,320 | Guillisen | Jan. 24, 1956 |

FOREIGN PATENTS

| | | |
|---|---|---|
| 500,963 | Belgium | Feb. 15, 1951 |
| 501,518 | Belgium | Mar. 15, 1951 |

OTHER REFERENCES

Rochow: Chemistry of the Silicones, Wiley, 1947, page 118.

Jervis: The Chemical Age, August 9, 1947, vol. 57, pages 187 and 188.

Speer et al.: Ind. & Eng. Chem., vol. 42, No. 2, pp. 251–253, Feb. 1950.